United States Patent [19]

Bischof et al.

[11] Patent Number: 4,724,512

[45] Date of Patent: Feb. 9, 1988

[54] ENCLOSED TRANSFER SWITCHING APPARATUS HAVING FUSES CONNECTED AT LOAD SIDE OF SWITCH

[75] Inventors: John F. Bischof; Warren C. Sipe, both of Cleveland, Tenn.

[73] Assignee: Eaton Corporation, Cleveland, Ohio

[21] Appl. No.: 917,768

[22] Filed: Oct. 10, 1986

[51] Int. Cl.[4] .................... H02B 1/10

[52] U.S. Cl. .................... 361/357; 200/50 A; 200/50 C; 361/347; 361/360

[58] Field of Search .................... 200/50 A, 50 C; 361/343, 357, 347, 360; 335/131-132, 159-161; 337/8-11

[56] References Cited

U.S. PATENT DOCUMENTS

Re. 26,113 11/1966 Carter et al. .................... 200/50
2,370,039 2/1945 Iglehart et al. .................... 200/5 R
2,970,245 1/1961 Weimer et al. .................... 361/357
3,369,100 2/1968 Kussy et al. .................... 200/330
3,767,872 10/1973 Whitchurch .................... 200/50 C
4,034,170 7/1977 Raabe et al. .................... 200/50 A
4,598,264 7/1986 Suter .................... 335/161

*Primary Examiner*—A. D. Pellinen
*Assistant Examiner*—Gregory D. Thompson
*Attorney, Agent, or Firm*—D. A. Rowe; L. G. Vande Zande

[57] ABSTRACT

A pair of slides (20,22) linearly reciprocally movable in opposite directions by a single operator handle (36) carry pins (24,26) which are received within dog-leg slots (**14*a*,14*b*; 14*a*',14*b*') of levers (14,14') affixed to rotary operating mechanisms (6,6') of repsective ones of a pair of switches (4,4') for operating one switch to an ON condition while maintaining the other switch in its OFF condition in response to handle (36) movement in one direction, and for operating the switches to their reverse conditions in response to handle movement in an opposite direction, both switches being in their OFF condition in a center neutral position of the handle. Fuses (40,42**) are connected to load side terminals of the switches and are connected together in common with the load to remove power from the fuses when the switches are OFF.

7 Claims, 6 Drawing Figures

ENCLOSED TRANSFER SWITCHING APPARATUS HAVING FUSES CONNECTED AT LOAD SIDE OF SWITCH

BACKGROUND OF THE INVENTION

This invention relates to enclosed manually operable electric switching apparatus commonly referred to as disconnect or safety switches. More specifically, this invention pertains to an enclosed switching apparatus of the aforementioned type which has two switching devices mounted within a common enclosure, both switches being controlled by a single handle, double-throw operating mechanism. Switching apparatus of this type is commonly used to alternatively connect one of two load devices to a source of electric power or to connect a singular load device alternatively to one of two separate sources of electric power. In either of the foregoing applications of such switching apparatus it is essential that only one of the switching devices be operated to an ON condition at any given period of time and that the other switching device remain in its OFF condition during that time.

U.S. Pat. No. 4,034,170 issued July 5, 1977 to R. D. Raabe et al discloses electrical transfer switching apparatus of the aforementioned type. The double-throw operating mechanism of that apparatus has a single slide member driven in alternate opposite directions by the handle. The single slide is connected to each switch device by respective operating levers of the switch devices. The single slide arrangement requires that the operating levers be mounted in reverse orientation with respect to each other to achieve the desired operation for the apparatus. Such reverse orientation requires that clearance space for lever movement be provided within the enclosure both fore and aft of the rotational axes of the switch devices, thereby establishing a certain minimum depth for the enclosure. Moreover, the single slide arrangement disclosed in Raabe et al is provided with alternative connection slots for the switch device operating levers for reverse operation of the switch devices. Accordingly, particular attention need be given during assembly of the apparatus to ensure that the operating levers are in fact mounted in reverse orientation since connection thereof to the slide in an improper orientation is possible and would result in both switch devices being operated to the ON condition at the same time.

In applications where the aforementioned type of switching apparatus is utilized as a fusible transfer switch to alternatively connect a load between two sources of electric power, the electric power sources are usually connected to the switch devices through the respective fuses. In such arrangement, the fuses remain electrically hot even when both switch devices are in their OFF condition. In such application the National Electric Code requires two single-throw (non-fusible) safety switches be mounted adjacent to the fusible transfer switch and connected between the respective source and fuses for each of the two sources to permit power to be disconnected from the fuses when servicing the same.

SUMMARY OF THE INVENTION

This invention provides enclosed manually operable electric switching apparatus wherein a pair of rotary operated switches are arranged to be controlled by a single handle pivotally mounted on the enclosure and reciprocally movable from a central neutral position. A crank arm is connected to the handle within the enclosure, the crank arm having a pair of crank pins located on opposite sides of the axis of the operator handle. Each crank pin is received within a slot in a respective one of a pair of slide members mounted for linear reciprocal movement within the switch enclosure, each slide member in turn carrying a post which is received within a dog-leg slot in a lever connected to the respective switch through a rotary operating mechanism. The operator handle is movable in one direction from a central neutral position wherein both switches are in OFF positions to cause the slides to move apart, the post of one slide thereby moving within the dog-leg slot of one lever to effect rotary operation of the associated switch to an ON position and the post of the other slide thereby moving within the dog-leg slot of a second lever to cause bypass operation of that lever, maintaining the associated second switch in its OFF position. Reverse movement of the operator handle to the central neutral position effects operation of the first switch to its OFF position while maintaining the second switch in the OFF position, and movement of the operator handle in an opposite direction from the central neutral position effects the reverse operation of the two switches. Fuses are provided at the load side of each switch, the fuses being connected together in common to the load, thereby to be disconnected from the respective power sources when the switches are in their OFF position.

DESCRIPTION OF THE PREFERRED EMBODIMENT

Figure 1:
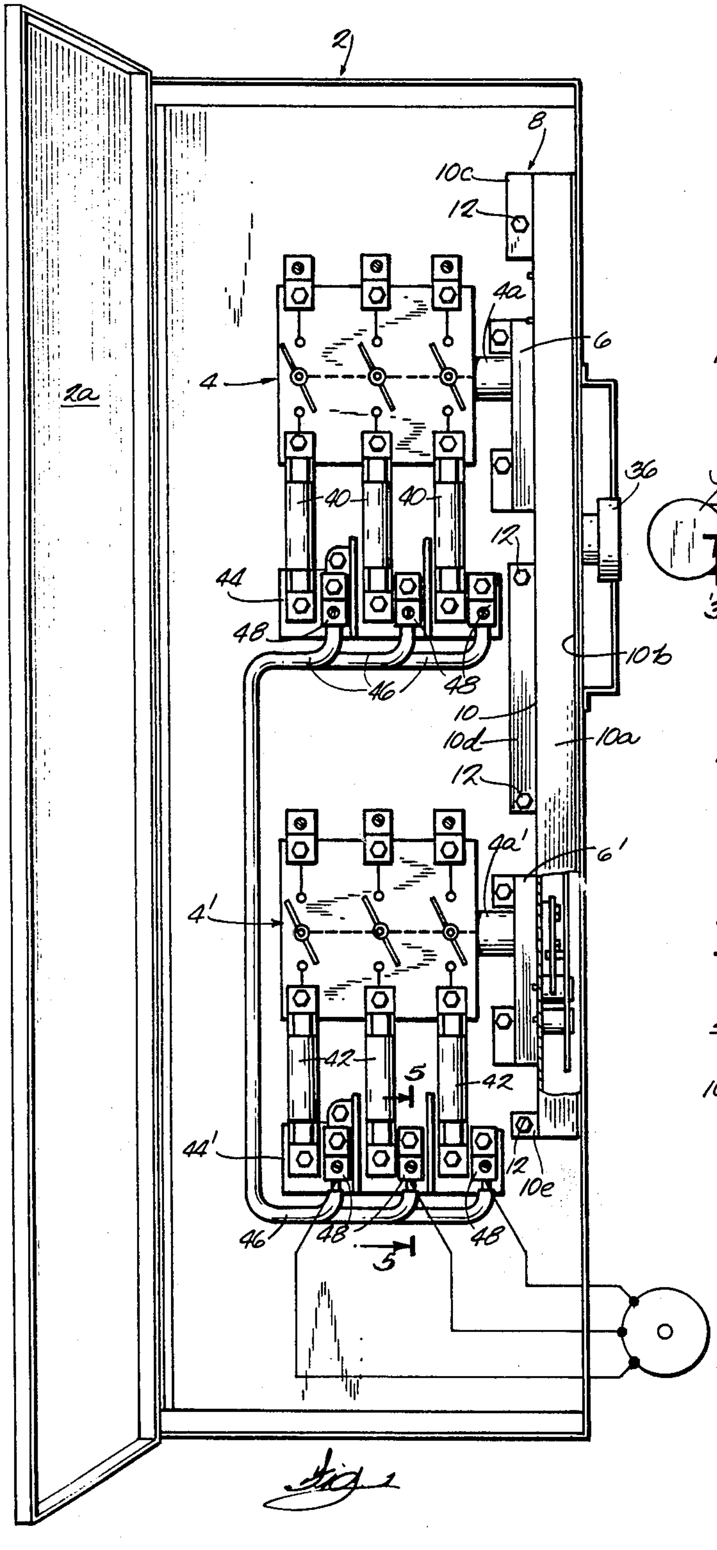
FIG. 1 is a front plan view of an enclosed switching apparatus constructed in accordance with this invention wherein a cover for the enclosure is shown in its open position.

Referring to FIG. 1 of the drawings, a box-like sheet metal enclosure 2 has a pair of rotary switches 4 and 4′ mounted to the rear wall thereof. The switches 4 and 4′ are identical and have been shown in schematic form inasmuch as their specific construction is unnecessary to an understanding of this invention. The switches 4 and 4′ are preferably knife blade disconnect switches of the type commonly employed in enclosed disconnect or safety switch apparatus and may be of the single break type operated from a rotary bail or of the double break type operated from a rotary shaft. Associated with each switch 4 and 4′ is a rotary operating mechanism 6 and 6′, the two rotary mechanisms being identical. The rotary operating mechanisms 6 and 6' are of the over center snap action type having a limited amount of lost motion between a driven input member and a driving output member and having a coupling connection between the input and output members which is powered by an over center spring. Such mechanisms are well known in conjunction with knife blade disconnect and safety switches and the detail of the rotary operating mechanism 6 and 6' have thereof been omitted from the drawings. The driven output member of the respective rotary operating mechanisms 6 and 6' is connected to the rotary bail or shaft 4*a* or 4*a*' of the respective switch associated with the rotary operating mechanism. The enclosure 2 has a cover 2*a* hinged along the left-hand edge thereof for closing off the open front of the enclosure.

Figure 3:
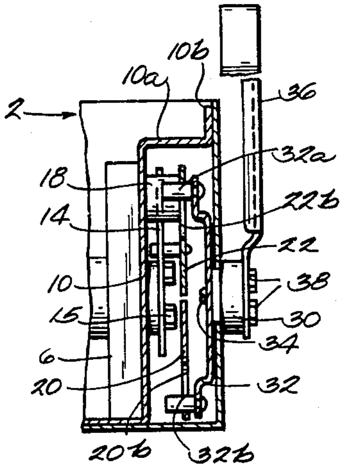
FIG. 3 is a cross sectional view taken along line 3—3 of FIG. 2 showing the pivotal mounting of the operator handle and crank arm to the enclosure, the handle and a cylindrical mounting hub being shown in elevation.
Figure 4:
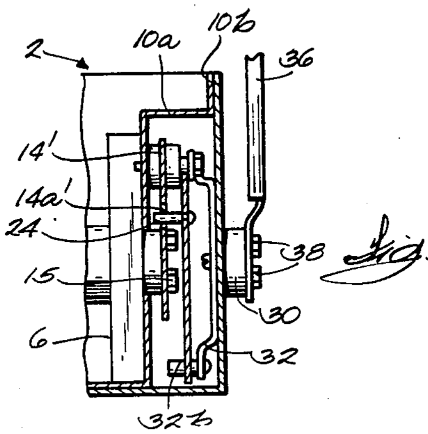
FIG. 4 is a cross sectional view taken along line 4—4 of FIG. 2 through a drive post of one slide of the operating mechanism received within a dog-leg slot of one lever associated with a rotary operating mechanism and rotary switch of the switching apparatus.

A double-throw operating mechanism 8 is also mounted within the enclosure 2 along the right-hand side wall thereof between that wall and the respective rotary operating mechanisms 6 and 6'. The operator mechanism 8 comprises an elongated metal plate 10 which is disposed in spaced relation and parallel to the side wall of enclosure 2. Referring also to FIGS. 3 and 4, plate 10 is formed over along its upper edge to provide an upper wall 10*a* parallel with the rear wall of enclosure 2 and extending to the right side wall of the enclosure. Upper wall 10*a* has a forwardly projecting flange 10*b* disposed adjacent the side wall of enclosure 2 for attachment thereto by rivets or the like (not shown). The lower edge of plate 10 has foot portions 10*c*, 10*d* and 10*e* (FIG. 1) formed over at right angles to seat upon the rear wall of enclosure 2 for attachment thereto by screws 12 or the like. As seen best in FIG. 6 plate 10 is provided with a pair of circular openings 10*f* through which hubs 6*a* or 6*a*' of the respective rotary operating mechanisms 6 and 6' project, the hubs being affixed to the driven input member of the respective rotary operating mechanism. A pair of identical operating levers 14 and 14' are idividually attached to the respective hubs 6*a* and 6*a*' by screws 15. Each lever 14, 14' has a dog-leg slot formed therein, the slot comprising a first portion 14*a*, 14*a*' which extends longitudinally in the direction of the major dimension of lever 14, 14' and a second portion 14*b*, 14*b*' which is contiguous with the first portion 14*a*, 14*a*' and offset therefrom at an obtuse angle. The levers 14, 14' are oriented in identical angular positions with respect to each associated switch and rotary operating mechanism.

Figure 6:
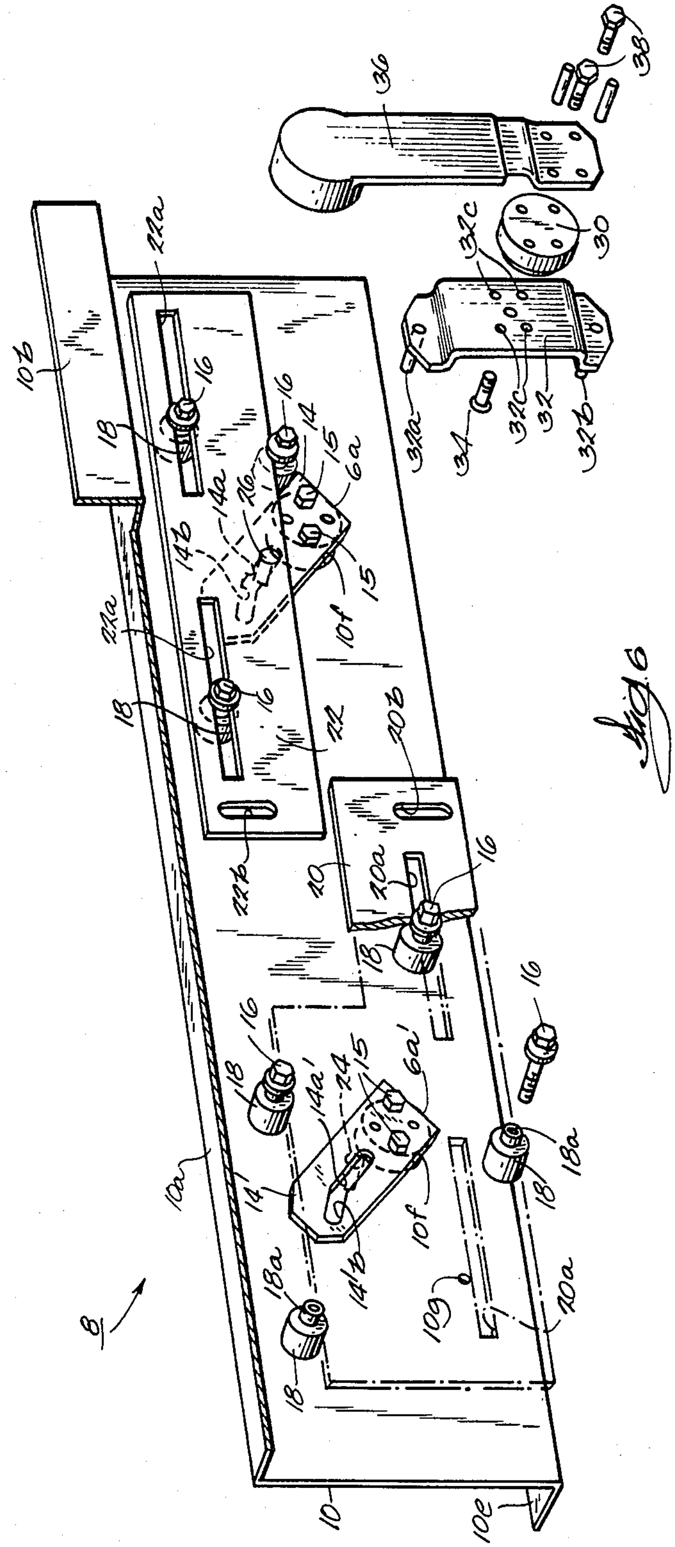
FIG. 6 is an isometric view, partly exploded, showing the operating mechanism of the switching apparatus of this invention.

Mounting plate 10 is further provided with a plurality of small holes 10*g*, only one of which is shown in FIG. 6, for threadably receiving self-tapping washer head screws 16. Associated with each screw 16 is a cylindrical spacer 18 which has a reduced diameter boss 18*a* projecting from one end thereof. Screws 16 and spacers 18 serve to attach a pair of slides 20 and 22 to the mounting plate 10. The spacer sleeves 18 are disposed against mounting plate 10 with the bosses 18*a* directed away from the plate such that an axial opening in the respective spacer sleeve is aligned with a respective hole 10*g* in the mounting plate. Slide 20 has a pair of longitudinally aligned rectangular slots 20*a* which receive the projecting boss 18*a* of respective spacer sleeves 18 therein. The height of bosses 18*a* is somewhat greater than the thickness of slides 20 or 22. Screws 16 are subsequently inserted through the axial openings of spacer sleeves 18 from the opposite side of slide 20 and are threaded into the respective holes 10*g* such that the washer head portion of screw 16 firmly seats against the face of boss 18*a* and securely fastens the spacer sleeve 18 to the mounting plate 10. Slide 20 is then free to slide longitudinally upon the bosses 18*a*. A second pair of spacer sleeves 18 are mounted to mounting plate 10 at the upper edge of slide 20 to receive the upper edge of slide 20 between the outer face of respective sleeves 18 and the washer head surface of the respective screws 16 to further guide the linear movement of slide 20. Slide 22 is similarly attached to mounting plate 10 by a pair of spacer sleeves 18 and cooperating screws 16 wherein the bosses 18*a* of those spacer sleeves project through longitudinally aligned rectangular slots 22*a* of slide 22. A third spacer sleeve 18 and screw 16 are mounted to receive and guide the lower edge of slide 22.

Slides 20 and 22 are flat rectangular members disposed in substantially end-to-end alignment on mounting plate 10. The upper right-hand end of slide 20 is notched away to permit overlapping movement thereof with the left-hand end of slide 22 as viewed in FIG. 6. The adjacent ends of slides 20 and 22 have vertically oriented slots 20*b* and 22*b*, respectively, formed therein, the slots 20*b* and 22*b* being vertically aligned when the slides 20 and 22 are in a neutral position of the mechanism. Slides 20 and 22 each have a drive post 24 and 26, respectively, attached thereto such as by riveting or the like. The posts 24 and 26 project transversely from the respective slides 20 and 22 toward mounting plate 10 to be received in the dog-leg slots of the respective levers 14', 14.

An operator handle assembly is pivotally mounted on the right side wall of enclosure 2 by a hub 30 which has an enlarged outer portion and a reduced diameter inner portion forming an annular shoulder which abuts against the outer surface of the side wall of enclosure 2. A crank arm 32 is attached at the interior of the enclosure to the smaller diameter portion of hub 30 by a screw 34 which takes into a tapped opening (not shown) in the hub 30 to hold the crank arm over four projecting bosses (not shown) on the hub which are received in openings 32*c* of the crank arm. The crank arm 32 and shoulder portion of hub 30 thereby serve to rotatably mount the hub and crank arm to the side of the enclosure. An operator handle 36 is attached to the enlarged outer portion of hub 30 by a pair of screws 38. Crank arm 32 has a pair of drive pins 32*a* and 32*b* attached thereto at opposite ends thereof, the drive pins being received within the slots 22*b* and 20*b*, respectively, of the respective slides 22 and 20.

Figure 2:
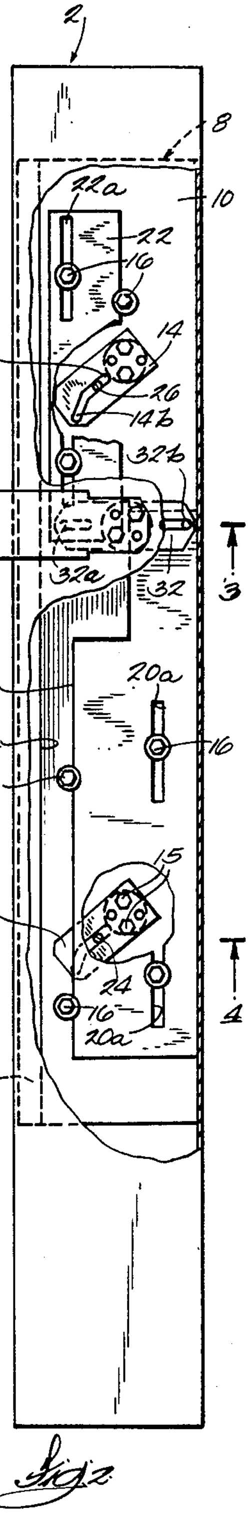
FIG. 2 is a side elevational view of the enclosed switching apparatus of FIG. 1 with portions broken away to show the operating mechanism.

As seen best in FIGS. 2 and 6, the operating mechanism is arranged such that in a neutral position wherein both switches 4 and 4' are in their open circuit conditions, operator handle 36 projects directly forward of the enclosure 2. In this position of operator handle 36, the drive pins 32*a* and 32*b* cause the slots 22*b* and 20*b* to be directly aligned with each other in alignment with the longitudinal dimension of the operator handle 36. Movement of the operator handle in an upward or clockwise rotational direction rotates the crank arm 32 such that the respective drive pins 32*a* and 32*b* operate within the slots 22*b* and 20*b* to cause the slides 22 and 20 to move linearly away from each other, that is, slide 22 moves to the right and slide 20 moves to the left as seen in FIG. 6. Movement of the operator handle in the downward or counterclockwise rotational direction causes the slides to move toward each other, that is, slide 22 moves to the left and slide 20 moves to the right as viewed in FIG. 6. In the neutral position wherein the handle 36 is positioned directly forward of the enclosure 2, the drive posts 24 and 26 are disposed within the longitudinal portions 14*a*', 14*a* of levers 14', 14. Linear movement of slide 22 upward (FIG. 2) or to the right (FIG. 6) in response to handle rotation as aforedescribed, carries the drive post 26 to the right and effects clockwise rotational movement of lever 14 associated with switch 4 and rotary operating mechanism 6. This rotational movement effects closure of the contacts of switch 4. At the same time, slide 20 moves downward (FIG. 2) or to the left (FIG. 6) in response to the same rotational movement of operator handle 36, carrying drive post 24 to the left therewith. The initial leftward movement of drive post 24 imparts a counterclockwise rotation to the lever 14' associated with switch 4' and rotary operating mechanism 6' until the angularly offset portion 14*b*' of the dog-leg slot of lever 14' becomes aligned with the linear direction of movement of slide 20, whereupon the post 24 moves into portion 14*b*' and slides therealong without imparting further rotational movement to lever 14'. Thus the switch 4' is maintained in its OFF position during upward or clock-wise rotational movement of operator handle 36.

Rotational movement of the operator handle 36 back to the neutral forwardly directed position effects the reverse operation of the levers 14, 14' described above. Thus the switch 4 is returned to its OFF position and the switch 4' and its rotary operating mechanism 6' is rotated back to its initial OFF position. Rotational movement of the operator handle 36 from the neutral position downward or counterclockwise causes the slides 20 and 22 to move toward each other as aforedescribed, such movement effecting clockwise rotational movement of the lever 14' associated with switch 4' and rotary operating mechanism 6' to move the switch 4' to its ON position whereas the switch 4 is maintained in its OFF position by virtue of the free motion of post 26 within the angularly offset portion 14*b* of the lever 14 associated with switch 4. Thus as the single operating lever 36 is moved either clockwise or counterclockwise from a center neutral position. Accordingly, both switches 4 and 4' may not be actuated to their ON condition at the same time.

Figure 5:
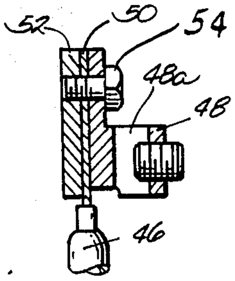
FIG. 5 is a cross sectional view taken along line 5—5 of FIG. 1 showing a connector arrangement for the switching apparatus of this invention.

The switches 4 and 4' have a plurality of fuses 40 and 42 connected to switch terminals at one side of the respective switches. The opposite ends of the fuses are received within fuse clips of an associated fuse clip base 44 and 44', respectively. Terminals at the respective opposite sides of each of the switches 4 and 4' may be connected to respective first and second power supplies. A plurality of wire conductors 46 are provided for connection to the fuse clip terminals of base 44, the wire conductors being received within an opening 48*a* of a wiring lug such as 48 as shown in FIG. 5. The opposite ends of the conductors 46 are provided with a terminal plate 50 (FIG. 5) which is disposed between fuse clip terminal plates 52 (FIG. 5) and wiring lugs 48 of fuse base 44'. A screw 54 passes through clearance openings in a mounting flange of lug 48 and the terminal plate 50 and threadably engages a hole in fuse clip terminal plate 52 to clamp the assembly firmly together in electrical contact. The provision of the terminal plate 50 enables the wire receiving opening 48*a* of lug 48 to be free for receiving wire conductors leading to the load device M (FIG. 1). This arrangement disconnects power from the fuses 40 and 42 when the respective switches 4 and 4' are in their OFF condition thereby enabling the fuses to be replaced or serviced without requiring additional switches to disconnect power from the fuses.

The foregoing has described a particular preferred embodiment of the enclosed transfer switching apparatus and fuse arrangement therefor of this invention, but is to be understood that the invention is not intended to be confined to the particular preferred embodiment inasmuch as it is susceptible of various modifications without departing from the scope of the appended claims.

We claim:

1. Enclosed switching apparatus wherein two rotary operated switches are controlled by a single operator handle assembly and operating mechanism arranged to prevent either switch from being actuted to its ON condition unless the other switch is in its OFF condition comprising:
   - an enclosure;
   - a pair of switches each having a rotary operating mechanism mounted in said enclosure;
   - an operator handle assembly mounted to said enclosure for rotary reciprocable movement in opposite directions from a center neutral position;
   - a pair of slides mounted in said enclosure for linear reciprocable movement, each slide having a pin projecting laterally therefrom and a slot extending perpendicularly to the direction of linear movement of said slide;
   - a pair of posts carried by said handle assembly, said posts being radially spaced from a rotational axis of said handle asembly on opposite sides of said axis and projecting laterally from said handle assembly into respective ones of said slots in said slides;
   - a pair of levers individually attached to a respective rotary operating mechanism, said levers being oriented in the same direction when said switches are in their OFF condition, each said lever having a dog-leg slot comprising a first portion extending longitudinally of said lever and an offset portion contiguous with said first portion and extending at an obtuse angle thereto, each said dog-leg slot receiving a pin of a respective slide in said first portion when said handle assembly is in said neutral position and said switches are in said OFF conditions;
   - rotary movement of said handle assembly in either of said opposite directions from said neutral position effecting linear movement of said slides in opposite directions causing said pin of one of said slides to rotate its respective lever in one direction operating a respective associated switch to an ON condition and said pin of the other of said slides to rotate its respective lever in a direction opposite said one direction aligning said dog-leg slot offset portion of the last mentioned lever with said linear movement of said other slide, said pin of said other slide thereafter moving within said offset portion without effecting further rotation of its respective lever maintaining its respective associated switch in an OFF condition.

2. The enclosed switching apparatus defined in claim 1 wherein movement of said handle assembly in one rotational direction effects linear movement of said slides away from each other and movement of said handle assembly in a second rotational direction effects linear movement of said slides toward each other.

3. The enclosed switching apparatus defined in claim 2 connected with an electrical load and arranged as transfer switching apparatus for switching said electrical load between alternative sources of electrical power, each said switch being connected to a respective power source at one side of said switch and having fuses connected in circuit with said load at an opposite side of said switch and means connecting said fuses of each said switch together in common with said load.

4. The enclosed switching apparatus defined in claim 3 wherein said means connecting said fuses of each said switch together in common with said load comprises a wire conductor connected at one end to a wiring lug with one of said switches and having a flat terminal attached to the other end, said flat terminal being disposed in electrical engagement between a fuse clip terminal and a wiring lug associated with the other of said switches, the last mention wiring lug receiving a wire conductor form said load.

5. Enclosed transfer switching apparatus for switching an electrical load between alternative sources of electrical power comprising:

an enclosure;

a pair of switches mounted in said enclosure;

an operating mechanism mounted to said enclosure and comprising a handle movable in oppsite directions for alternatively operating one or the other of said switches to its ON condition;

said switches each having terminals at first and second sides thereof, said terminals at said first side of one of said switches being connected to a first power source and said terminals at a first side of the other of said switches being connected to a second power source first fuses connected at one end thereof to said terminals at said second side of said one of said switches, and second fuses connected at one end thereof to said terminals of said second side of the other of said switches; and means connecting an opposite end of a respective one of said first fuses to an opposite end of a corresponding respective one of said second fuses in common with an electrical load.

6. The enclosed transfer switching apparatus defined in claim 5 wherein said means connecting said opposite ends of said first and second fuses together in common with said load comprises a wire conductor connected at one end to a wiring lug connector of a fuse clip terminal associated with a respective said first fuse, said conductor having a flat terminal attached to the other end thereof, said flat terminal being disposed in electrical engagement between a fuse clip terminal and a wiring lug associated with a respective said second fuse, the last mentioned wiring lug receiving a wire conductor from said load.

7. An enclosed switch assembly having a double-throw operating mechanism for alternately operating one of two switches comrising:

an enclosure;

first and second switches mounted in said enclosure, each switch having a rotary operating mechanism;

first and second levers attached to said operating mechanism of said first and second switches, respectively, each lever having a dog-leg slot therein and each lever being oriented in the same direction with said first and second switches in their OFF conditions;

first and second slides mounted for linear reciprocable movement within said enclosure, each slide having a slot elongated in a direction perpendicular to said linear reciprocable movement and a pin projecting from each respective slide received with said dog-leg slot of a respective one of said first and second levers.

an operator handle assembly pivotally mounted to said enclosure for rotary reciprocable movement;

first and second projections carried by said handle assembly radially spaced from a rotational axis of said handle assembly and received within said elongated slots of said first and second slides, respectively;

movement of said handle assembly in a first direction from a center neutral position wherein said first and second switches are in their OFF conditions effecting linear movement of said slides away from eahch other, said pin of said first slide effecting rotary movement of said rotary operating mechanism of said first switch operating said first switch from its OFF to its ON condition and said pin of said second slide effecting limited rotary movement of said rotary operating mechanism of said second switch in an opposite direction until an offset portion of said dogleg slot in said second lever aligns with linear movement of said second slide whereupon said second slide pin moves freely in said offset portion without effecting further rotation of said second lever maintaining said second switch in its OFF condition; and movement of said handle assembly in a second direction from said center neutral position effecting linear movement of said slides toward each other, said pin of said second slide effecting rotary movement of said second switch rotary operating mechanism operating that switch from its OFF to its ON condition and said pin of said first slide effecting limited rotary movement of said first switch rotary operating mechanism in an opposite direction until an offset portion of said dog-leg slot in said.first lever aligns with linear movement of said first slide maintaining said first switch in its OFF conditon.

* * * * *